United States Patent
Araki et al.

(10) Patent No.: US 11,544,946 B2
(45) Date of Patent: Jan. 3, 2023

(54) SYSTEM AND METHOD FOR ENHANCING NEURAL SENTENCE CLASSIFICATION

(71) Applicant: Robert Bosch GmbH, Stuttgart (DE)

(72) Inventors: Jun Araki, San Jose, CA (US); Khanh Linh Hoang, San Jose, CA (US)

(73) Assignee: Robert Bosch GmbH, Stuttgart (DE)

( * ) Notice: Subject to any disclaimer, the term of this patent is extended or adjusted under 35 U.S.C. 154(b) by 224 days.

(21) Appl. No.: 16/728,019

(22) Filed: Dec. 27, 2019

(65) Prior Publication Data

US 2021/0201015 A1     Jul. 1, 2021

(51) Int. Cl.
| | |
|---|---|
| *G06V 30/413* | (2022.01) |
| *G06N 3/02* | (2006.01) |
| *G06N 5/02* | (2006.01) |
| *G06K 9/62* | (2022.01) |

(52) U.S. Cl.
CPC ......... *G06V 30/413* (2022.01); *G06K 9/6268* (2013.01); *G06N 3/02* (2013.01); *G06N 5/02* (2013.01)

(58) Field of Classification Search
None
See application file for complete search history.

(56) References Cited

U.S. PATENT DOCUMENTS

| | | | | |
|---|---|---|---|---|
| 2011/0270604 A1* | 11/2011 | Qi | .......................... | G06F 40/30 704/9 |
| 2018/0150743 A1* | 5/2018 | Ma | .......................... | G06N 3/084 |
| 2018/0165554 A1* | 6/2018 | Zhang | .................... | G06N 7/005 |
| 2020/0034465 A1* | 1/2020 | Brake | ................. | G06F 16/3323 |
| 2020/0175046 A1* | 6/2020 | Wang | .................... | G06F 16/334 |
| 2020/0250379 A1* | 8/2020 | Wang | .................... | G06N 3/084 |

FOREIGN PATENT DOCUMENTS

| | | | |
|---|---|---|---|
| CN | 108509654 A | * | 9/2018 |
| CN | 110008353 A | * | 7/2019 |
| CN | 110334190 A | | 10/2019 |

OTHER PUBLICATIONS

Representation Learning of Knowledge Graphs via Fine-Grained Relation Description Combinations. He et al. (Year: 2019).*

* cited by examiner

*Primary Examiner* — Delomia L Gilliard
(74) *Attorney, Agent, or Firm* — Brooks Kushman P.C.

(57) ABSTRACT

A system and method is disclosed for classifying natural language sentences by employing external knowledge to assist in constructing a knowledge base of sentences with a target meaning. The disclosed system and method provide a general sentence classification framework applicable for a knowledge-oriented domain (e.g., domain-specific knowledge). The system and method may be implemented in an intelligent automotive aftermarket assistance tool to assist with the identification of sentences describing specific problems and solutions for car repairs. In addition to the domain adaptability, the system and method is language-independent and could be applicable to any natural written language.

20 Claims, 4 Drawing Sheets

SYSTEM AND METHOD FOR ENHANCING NEURAL SENTENCE CLASSIFICATION

TECHNICAL FIELD

The present disclosure relates to a system and method for classifying natural language sentences using external knowledge.

BACKGROUND

In the field of natural language processing (NLP), information extraction (IE) typically involves the structuring and organizing of information resources from unstructured text. Once complete, IE enables efficient and effective utilization (e.g., searching) of information in downstream applications. IE is generally used to process human language texts by means of natural language processing (NLP) technologies. However, IE may also be used in multimedia document processing to handle automatic annotation and content extraction out of images/audio/video/documents.

SUMMARY

According to one embodiment, a system and method is disclosed for classifying natural language sentences. The system and method may include receiving a textual sentence and encoding the textual sentence to produce a low-dimensional textual vector representation. A knowledge graph may be constructed using one or more relational triplets that include a subject, object, and a relation between the subject and the object. The knowledge graph may be encoded using the one or more relational triplets to produce a low-dimensional knowledge vector representation. One or more links may be identified between the low-dimensional knowledge vector representation and the low-dimensional textual vector representation. The textual sentence may be classified using the one or more links.

The one or more relational triplets may be encoded using a translating embedding TransE algorithm or a ConvE algorithm. The knowledge graph may also be embedded to generate a pool of vector representations for the one or more relational triplets. Top-K relevant entities may be retrieved from the textual low-dimensional vector representation.

DETAILED DESCRIPTION

Figure 1:
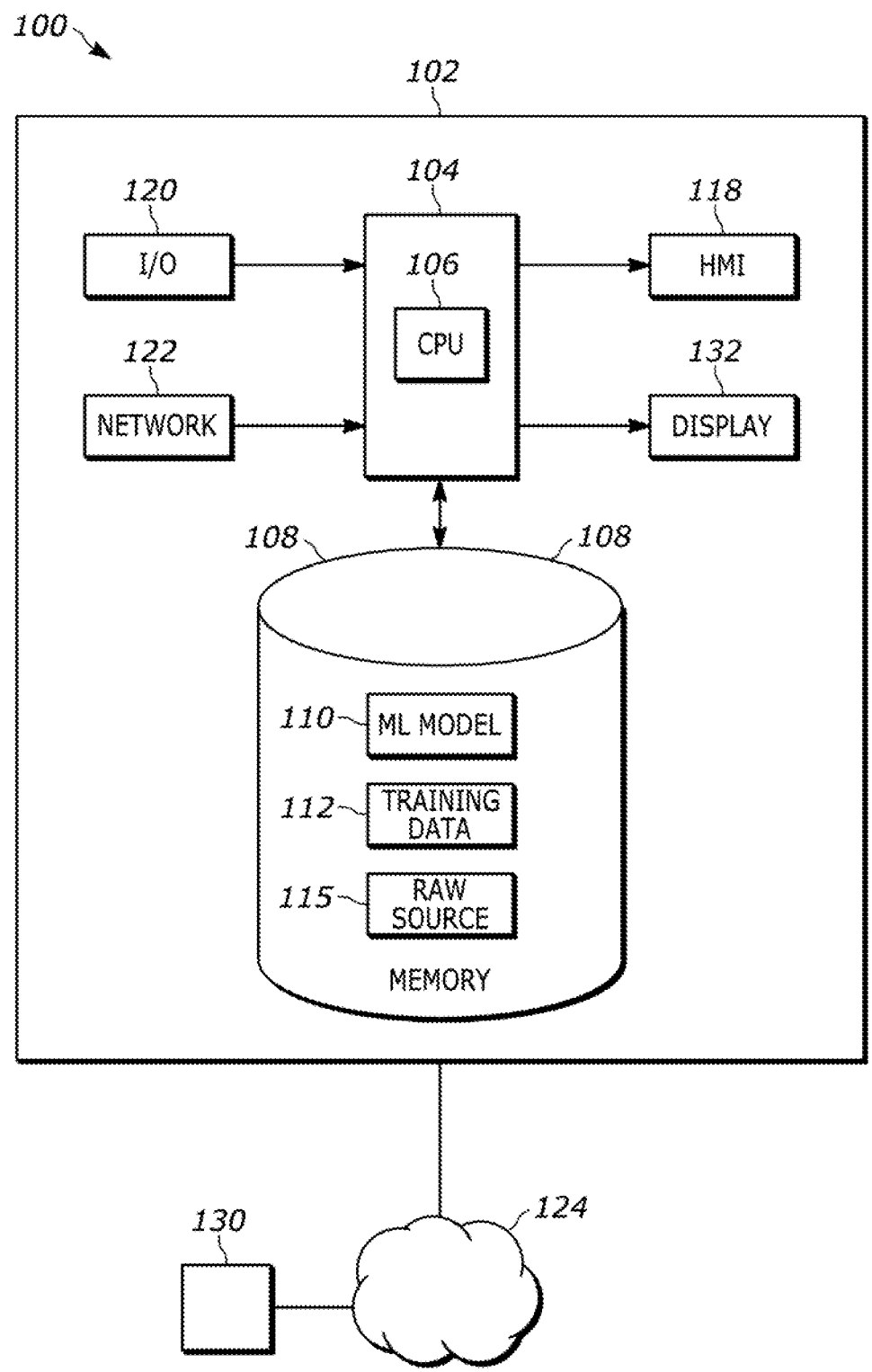
FIG. 1 depicts an exemplary computing system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring to the use of IE for textual applications, it is generally understood that a single sentence can be a proper unit of information for conveying a specific type of knowledge. For instance, the sentence "My car's horn doesn't make sound" could be understood as a sentence describing an acoustic problem with a vehicle horn. It may also be understood that the entire sentence is an ideal unit for the car problem description because a sub-sentence phrase (i.e., "doesn't make sound") only partially conveys the problem. As shown by this example, sentence classification can be seen as one IE task used to form a structured knowledge base (KB) of sentences that have a target meaning (e.g., car problems).

Sentence classification is widely studied in the field of NLP. However, most of the existing sentence classification systems are focusing on models that are trained on a human-annotated dataset to learn linguistic regularities associated with target labels, lacking the ability to integrate with external knowledge adequately. Such knowledge can be useful for knowledge-oriented sentence classification tasks.

For instance, a sentence stating "The tailgate of my car opens to 67 inches" may describe a car problem (i.e., the tailgate does not open to an expected height) or factual statements about the tailgate (i.e., the expected height of the opened tailgate). Determining whether the sentence is a factual statement or a car problem may require external knowledge-oriented and domain-specific information regarding the vehicle (e.g., the expected opening width of the tailgate).

Such external knowledge may assist in enhancing the understanding and meaning of the provided sentence. It is also contemplated that such assistance may be provided by using a machine learning algorithm that combines a sentence embedding constructed by a neural sentence encoder and a relevant knowledge graph embedding retrieved from a knowledge graph.

FIG. 1 depicts an exemplary system 100 that may be used for classifying natural language sentences using external knowledge. The system 100 may include at least one computing device 102. For instance, system 100 may be a Bosch® ESI diagnostic tool designed to operate on a handheld tablet that enables a technician the capability of efficiently diagnosing and repairing heavy duty trucks and commercial vehicles.

The computing system 102 may include at least one processor 104 that is operatively connected to a memory unit 108. The processor 104 may be one or more integrated circuits that implement the functionality of a central processing unit (CPU) 106. It is contemplated that CPU 106 may also be one or more integrated circuits that implement the functionality of a general processing unit or a specialized processing unit (e.g., graphical processing unit, ASIC, FPGA).

The CPU 106 may be a commercially available processing unit that implements an instruction stet such as one of the x86, ARM, Power, or MIPS instruction set families. During operation, the CPU 106 may execute stored program instructions that are retrieved from the memory unit 108. The stored program instructions may include software that controls operation of the CPU 106 to perform the operation described herein. In some examples, the processor 104 may be a system on a chip (SoC) that integrates functionality of the CPU 106, the memory unit 108, a network interface, and input/output interfaces into a single integrated device. The computing system 102 may implement an operating system for managing various aspects of the operation.

The memory unit 108 may include volatile memory and non-volatile memory for storing instructions and data. The non-volatile memory may include solid-state memories, such as NAND flash memory, magnetic and optical storage media, or any other suitable data storage device that retains data when the computing system 102 is deactivated or loses electrical power. The volatile memory may include static and dynamic random-access memory (RAM) that stores program instructions and data. For example, the memory unit 108 may store a machine-learning model 110 or algorithm, training dataset 112 for the machine-learning model 110, and/or raw source data 115.

The computing system 102 may include a network interface device 122 that is configured to provide communication with external systems and devices. For example, the network interface device 122 may include a wired and/or wireless Ethernet interface as defined by Institute of Electrical and Electronics Engineers (IEEE) 802.11 family of standards. The network interface device 122 may include a cellular communication interface for communicating with a cellular network (e.g., 3G, 4G, 5G). The network interface device 122 may be further configured to provide a communication interface to an external network 124 or cloud.

The external network 124 may be referred to as the world-wide web or the Internet. The external network 124 may establish a standard communication protocol between computing devices. The external network 124 may allow information and data to be easily exchanged between computing devices and networks. One or more servers 130 may be in communication with the external network 124.

The computing system 102 may include an input/output (I/O) interface 120 that may be configured to provide digital and/or analog inputs and outputs. The I/O interface 120 may include additional serial interfaces for communicating with external devices (e.g., Universal Serial Bus (USB) interface).

The computing system 102 may include a human-machine interface (HMI) device 118 that may include any device that enables the system 100 to receive control input. Examples of input devices may include human interface inputs such as keyboards, mice, touchscreens, voice input devices, and other similar devices. The computing system 102 may include a display device 132. The computing system 102 may include hardware and software for outputting graphics and text information to the display device 132. The display device 132 may include an electronic display screen, projector, printer or other suitable device for displaying information to a user or operator. The computing system 102 may be further configured to allow interaction with remote HMI and remote display devices via the network interface device 122.

The system 100 may be implemented using one or multiple computing systems. While the example depicts a single computing system 102 that implements all of the described features, it is intended that various features and functions may be separated and implemented by multiple computing units in communication with one another. The particular system architecture selected may depend on a variety of factors.

The system 100 may also be operable to implement a machine-learning algorithm 110 that is configured to analyze the raw source data 115. The raw source data 115 may include a natural language sentence or natural language words. However, it is also contemplated that the raw source data 115 may also include video, video segments, images, and raw or partially processed sensor data. In some examples, the machine-learning algorithm 110 may be a neural network algorithm that is designed to perform a predetermined function.

The system 100 may store a training dataset 112 for the machine-learning algorithm 110. The training dataset 112 may represent a set of previously constructed data for training the machine-learning algorithm 110. The training dataset 112 may be used by the machine-learning algorithm 110 to learn weighting factors associated with a neural network algorithm. The training dataset 112 may include a set of source data that has corresponding outcomes or results that the machine-learning algorithm 110 tries to duplicate via the learning process. In this example, the training dataset 112 may include source images and depth maps from various scenarios in which objects (e.g., pedestrians) may be identified.

The machine-learning algorithm 110 may be operated in a learning mode using the training dataset 112 as input. The machine-learning algorithm 110 may be executed over several iterations using the data from the training dataset 112. With each iteration, the machine-learning algorithm 110 may update internal weighting factors based on the achieved results. For example, the machine-learning algorithm 110 can compare output results with those included in the training dataset 112. Since the training dataset 112 includes the expected results, the machine-learning algorithm 110 can determine when performance is acceptable. After the machine-learning algorithm 110 achieves a predetermined performance level (e.g., 100% agreement with the outcomes associated with the training dataset 112), the machine-learning algorithm 110 may be executed using data that is not in the training dataset 112. The trained machine-learning algorithm 110 may be applied to new datasets to generate annotated data.

The machine-learning algorithm 110 may also be configured to identify a feature in the raw source data 115. The raw source data 115 may include a plurality of instances or input dataset for which annotation results are desired. For example, the machine-learning algorithm 110 may be configured to identify the presence of a pedestrian in images and annotate the occurrences. The machine-learning algorithm 110 may be programmed to process the raw source data 115 to identify the presence of the features. The machine-learning algorithm 110 may be configured to identify a feature in the raw source data 115 as a predetermined feature. The raw source data 115 may be derived from a variety of sources. For example, the raw source data 115 may be actual input data collected by a machine-learning system. The raw source data 115 may be machine generated for testing the system. As an example, the raw source data 115 may include raw digital images from a camera.

In the example, the machine-learning algorithm 110 may process raw source data 115 and generate an output. A machine-learning algorithm 110 may generate a confidence level or factor for each output generated. For example, a confidence value that exceeds a predetermined high-confidence threshold may indicate that the machine-learning algorithm 110 is confident that the identified feature corresponds to the particular feature. A confidence value that is less than a low-confidence threshold may indicate that the machine-learning algorithm 110 has some uncertainty that the particular feature is present.

Figure 2:
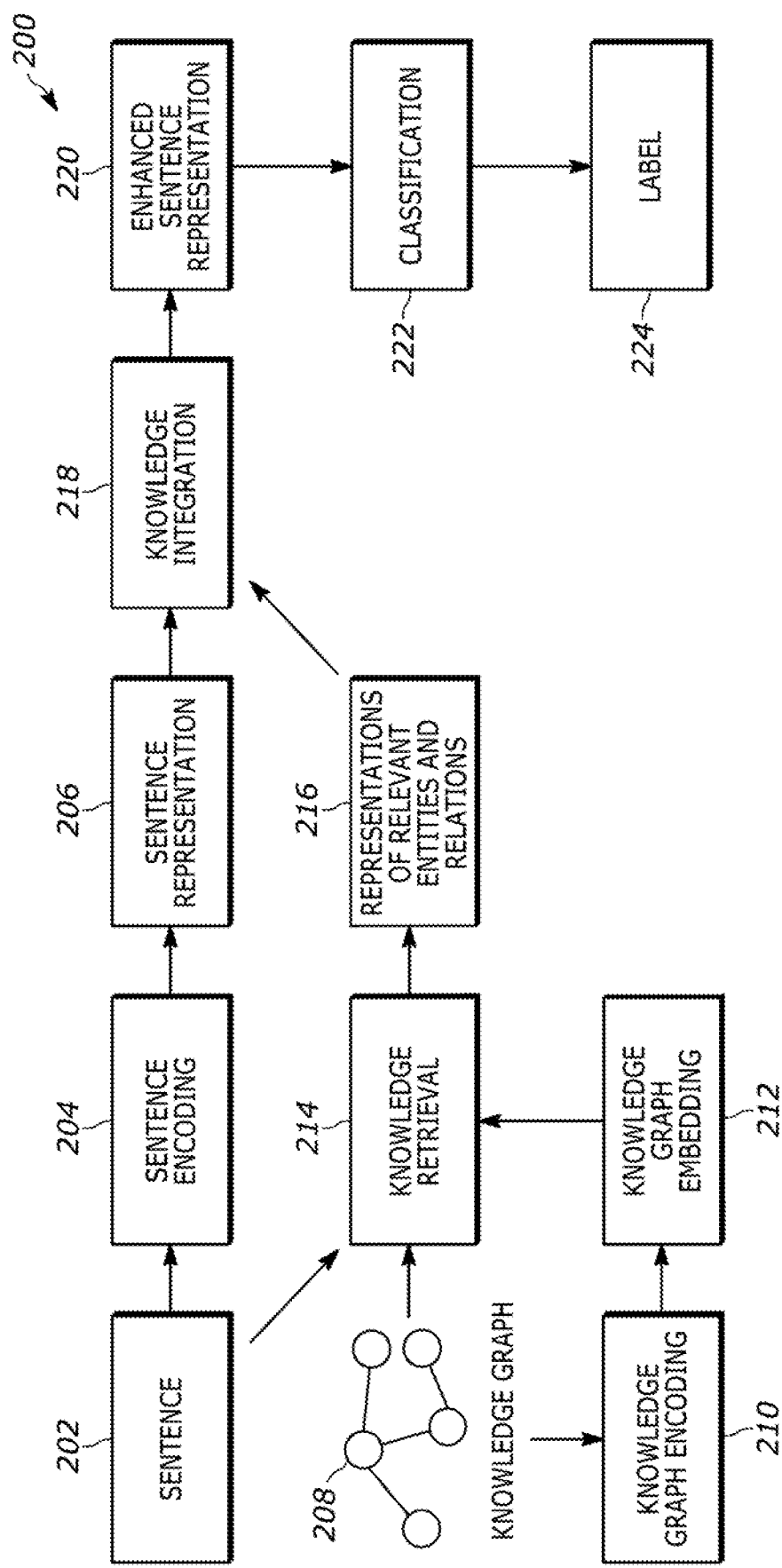
FIG. 2 illustrates a flow diagram for sentence classification using external knowledge.

FIG. 2 illustrates a flow diagram 200 for classifying and understanding a textual statement (i.e., a sentence). At Block 202, a textual sentence may be provided (e.g., typed or spoken) to system 100. The textual sentence may be provided to block 204 where a sentence encoder is used to produce a low-dimensional vector representation for the textual sentence. It is contemplated that Block 204 may be operable to encode the textual sentence as a low-dimensional vector representation using the machine-learning model 110 that may be designed using a Long Short-Term Memory (LSTM) Network or a Convolutional Neural Network (CNN). Once encoded Block 206 may include a complete representation of the provided textual sentence.

Figure 3:
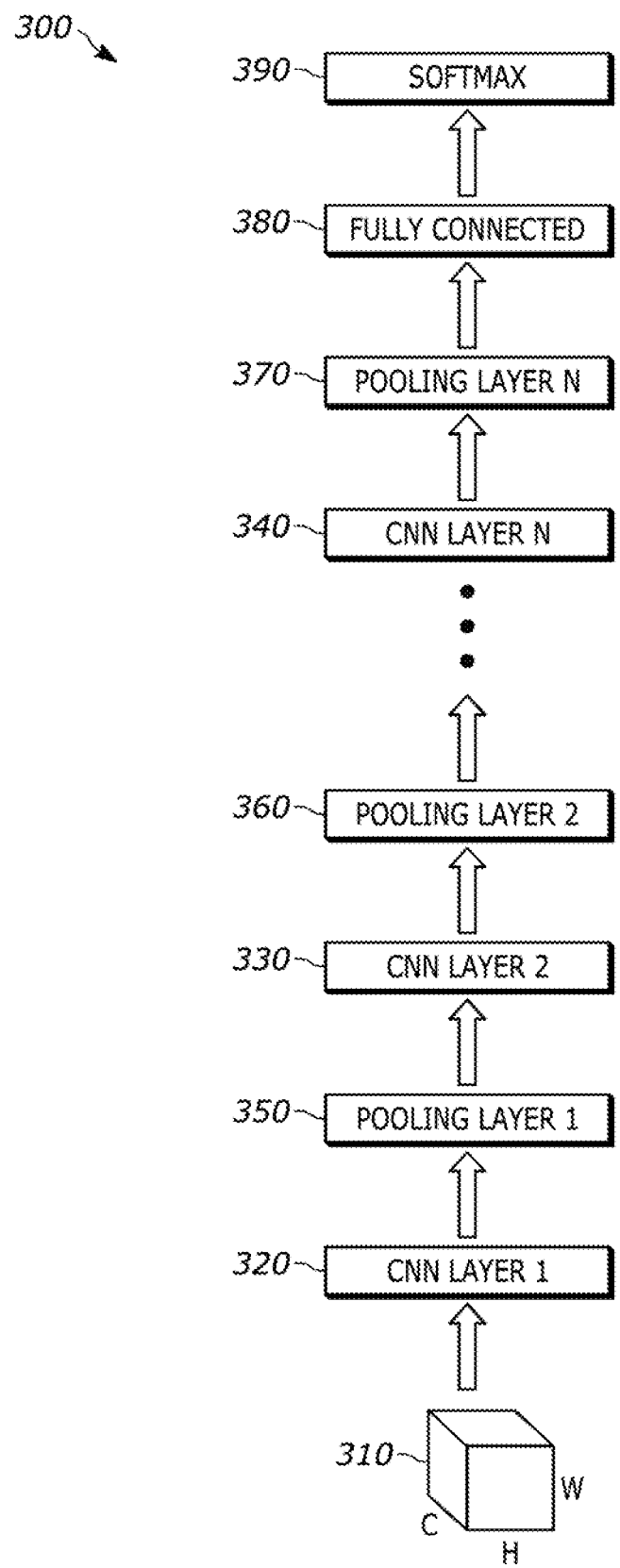
FIG. 3 illustrates an exemplary convolutional neural network.

For instance, FIG. 3 illustrates a non-limiting example of a CNN 300 that includes: an input dataset 310; one or more convolutional layers 330-340; one or more pooling layers 350-370; a fully connected layer 380; and a softmax layer 390.

While it is contemplated that the input dataset 310 may be the textual sentence provided to system 100, it is also contemplated that the input dataset 310 may include raw images or voice data, or other forms of textual data. It is also contemplated that input dataset 310 may be lightly processed prior to being provided to CNN 300. Convolutional layers 320-340 may be operable to extract features from the input dataset 310. It is generally understood that convolutional layers 320-340 may be operable to apply filtering operations (e.g., kernels) before passing on the result to another layer of the CNN 300. For instance, for a given dataset, the convolution layers may execute filtering routines to perform operations such as image identification, edge detection of an image, and image sharpening.

It is also contemplated that the CNN 300 may include one or more pooling layers 350-370 that receive the convoluted data from the respective convolution layers 320-340. Pooling layers 350-370 may include one or more pooling layer units that apply a pooling function to one or more convolution layer outputs computed a different bands using a pooling function. For instance, pooling layer 350 may apply a pooling function to the kernel output received from convolutional layer 320. The pooling function implemented by pooling layers 350-370 may be an average or a maximum function or any other function that aggregates multiple values into a single value.

A fully connected layer 380 may also be operable to learn non-linear combinations for the high-level features in the output data received from the convolutional layers 320-340 and pooling layers 350-370. Lastly, CNN 300 may include a softmax layer 390 that combines the outputs of the fully connected layer 380 using softmax functions. It is contemplated that the neural network algorithm shown by FIG. 3 may be configured for operation within automotive applications to produce a low-dimensional vector representation for a textual sentence regarding the design and operation of an automotive vehicle.

Figure 4:
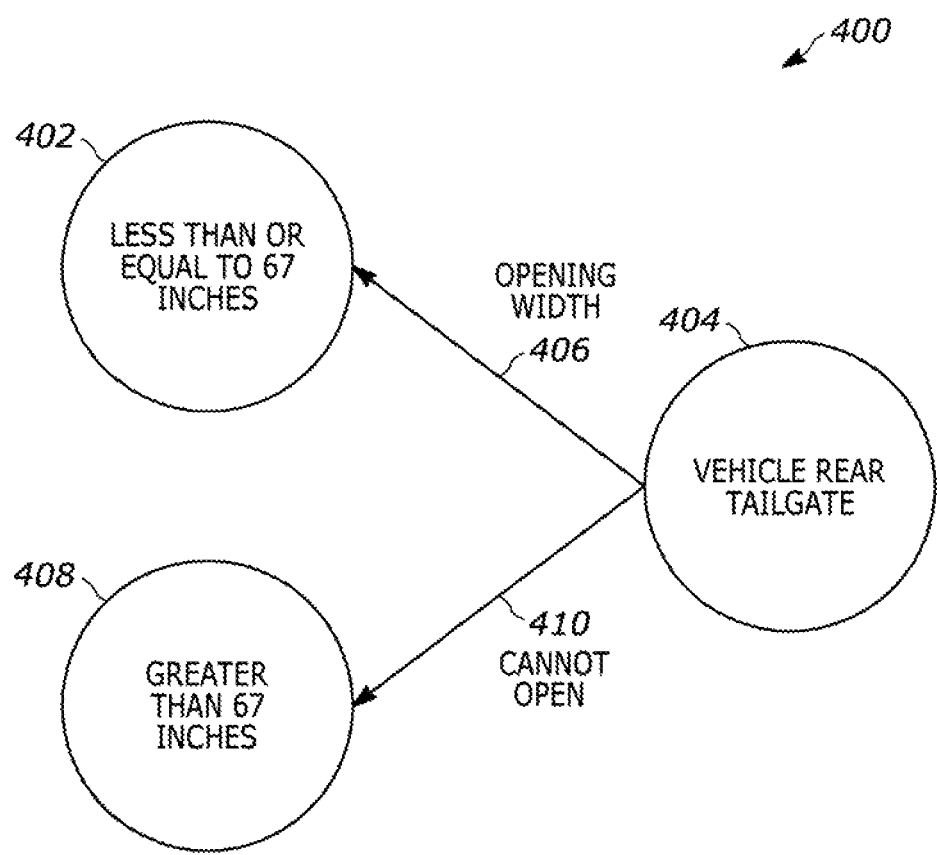
FIG. 4 illustrates an exemplary knowledge graph.

With reference to FIG. 2, Block 208 illustrates a knowledge graph that may be constructed to define a set of objects (e.g., vehicle components or operational parameters) and the operational parameters between these objects. For instance, FIG. 4 illustrates a knowledge graph 400 that is designed to include a set of relational triplets that include a subject 402, object 404, and a relation 406 between the subject 402 and object 404. The relational triplet may be constructed such that the definition is defined as relational triplet=(subject, relation, object). It is contemplated that knowledge graph 400 may be operable to allow a full-text search which can then be used to construct natural language sentences from the relational triplets—i.e. the subject 402, object 404, and the relation 406. For instance, the knowledge graph 400 may be constructed such that the relational triplet is constructed as the subject 402 being "67 inches," the object 404 being "vehicle rear tailgate," and the relation 406 being "opening width." Based on this relational triplet, knowledge graph 400 can be used to construct a sentence which reads: "Vehicle rear tailgate opening width is less than or equal to 67 inches."

However, it is further contemplated that additional sentences can be created using knowledge graph 400 by repeating the same process using additional relational triplets. For instance, an additional subject 408 may be "greater than 67 inches" and an additional relation 410 being "cannot open." Based on this relational triplet, knowledge graph 400 can be used to construct a sentence which reads "Vehicle rear tailgate cannot extend greater than 67 inches." Each of the sentences constructed by knowledge graph 400 can be used to synthesize a document about the operational characteristics of a vehicle. The synthesized documents may be indexed to provide full-text searching. For instance, the synthesized entity documents for knowledge graph 400 may be synthesized into a document that provides a full-text search about a given vehicle (e.g., a mid-size van).

At Block 210 an encoder is used to generate a context-related knowledge vector from the knowledge graph. It is contemplated that encoder may operate using a machine learning algorithm such as a Graph CNN. Once encoded, Block 212 embeds the knowledge graph to generate a pool of vector representations of a knowledge graph where the object entities (i.e., subject and object) and the relations between the objects are encoded into low-dimensional vectors. It is contemplated that Block 212 may operate using a translating embeddings (TransE) or a multi-layer convolutional network model for link prediction (e.g., ConvE) to construct low-dimensional vector representations for entities and relations from the knowledge graph. It is contemplated that the TransE algorithm may be used to predict missing relationships from the knowledge graph by modeling relationships by interpreting each relationship as a translation using the low-dimensional embedding of the knowledge graph entities. It is also contemplated that the ConvE model may be designed using two-dimensional convolutions over embeddings to predict missing links in the knowledge graph. ConvE may be designed as a single convolution layer, a projection layer to the embedding dimension, and an inner product layer.

At Block 214, a retrieval algorithm operates to retrieve the entities and relations from the knowledge graph using the textual sentence provided at Block 202. It is contemplated that knowledge retrieval may differ from known document retrieval systems currently implemented by modern search engines (e.g., Google and Bing). Knowledge retrieval may instead operate to retrieve entities and relations from knowledge graph. For instance, knowledge retrieval may operate using a supervised knowledge graph model that optimizes attention weights over entities and relations in the knowledge graph. However, such a knowledge graph retrieval model may be computationally intense because there may exist many entities and relations. It is contemplated that Block 214 may instead leverage an efficient knowledge retrieval mechanism like known document retrieval systems using the synthesized documents from entities and relations in the knowledge graph. For instance, Block 214 may perform a full-text search over the documents created using the knowledge graph. Block 214 may then process the sentence representations to retrieve the top-K relevant entities and their corresponding entity embeddings from the knowledge graph embedding. In addition to the entity embeddings, Block 214 may operate to retrieve relation embeddings by taking relations associated with the retrieved entities. Block 216 may then operate to generate a representation of the relevant entities and relations retrieved from Block 214.

Block 218 may then integrate the sentence representation provided by Block 206 and the relevant entity and relation representations provided by Block 216. In other words, the knowledge integrator implemented at Block 218 will retrieve knowledge provided by the knowledge graph (e.g., Knowledge Graph 300) which may be considered relevant to the textual sentence provided at Block 202.

It is contemplated that a Block 218 may attempt to identify links between entity mentions in a sentence and entity nodes in the knowledge graph by employing submodules of entity detection and linking. The identified links may be operably designed so that entity mentions in a sentence may be grounded to entity nodes in the knowledge base. The identified links may also be operable to use the grounded entities as a trigger to retrieve relevant knowledge provided by the knowledge graph. It is understood, however, that entity detection and linking is computationally problematic. For instance, a submodule within the knowledge graph may be erroneously constructed with misrecognized entities thereby resulting in hindered performance. It is therefore contemplated that Block 218 may attempt to overcome generated errors by directly receiving the textual sentence provided from Block 206 as a query for knowledge retrieval thereby avoiding the need for entity detection and linking. The formalization performed by Block 218 allows the raw sentence (i.e., textual sentence provided at Block 202) to be used as a query to retrieve relevant entities and relations provided by Block 216 in a more computationally efficient manner without the need to use complex entity and relation extraction modules.

For instance, Block 218 may combine the sentence representations (from Block 206) and the representations of retrieved entities and relations (from Block 216). For the combination, Block 218 may use the concatenation of the two vectors or a weighted average of them. The resulting enhanced sentence representations is then provided to Block 220 where it may be used for training a supervised classifier on a human-annotated dataset (i.e., Block 222). At Block 224 a sentence-level label is applied to the classifications generated.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method comprising:
   generating a sentence representation of a textual sentence;
   retrieving entities and relations from a knowledge graph that are relevant to the textual sentence;
   generating a representation of the relevant entities and relations; and
   combining the sentence representation and the representation of the relevant entities and relations to produce an enhanced sentence representation.

2. The method of claim 1, wherein the generated sentence representation is a low-dimensional vector representation.

3. The method of claim 2, further comprising:
   encoding the textual sentence, by a long short-term memory network, to produce the low-dimensional vector representation.

4. The method of claim 2, further comprising:
   encoding the textual sentence, by a convolutional neural network, to produce the low-dimensional vector representation.

5. The method of claim 1, wherein the retrieving of the relevant entities and relations comprises performing a full-text search over documents created from the knowledge graph.

6. The method of claim 5, wherein the performing of the full-text search comprises querying the documents with the textual sentence as a query.

7. The method of claim 1, wherein the enhanced sentence representation is used to train a supervised classifier on a human-annotated dataset.

8. The method of claim 1, wherein the knowledge graph is an external knowledge graph.

9. One or more non-transitory storage media comprising computer-executable instructions that, when executed, perform a method comprising:
   generating a sentence representation of a textual sentence;
   retrieving entities and relations from a knowledge graph that are relevant to the textual sentence;

generating a representation of the relevant entities and relations; and combining the sentence representation and the representation of the relevant entities and relations to produce an enhanced sentence representation.

10. The one or more non-transitory storage media of claim 9, wherein the generated sentence representation is a low-dimensional vector representation.

11. The one or more non-transitory storage media of claim 10, wherein the method further comprises:

encoding the textual sentence, by a long short-term memory network, to produce the low-dimensional vector representation.

12. The one or more non-transitory storage media of claim 10, wherein the method further comprises:

encoding the textual sentence, by a convolutional neural network, to produce the low-dimensional vector representation.

13. The one or more non-transitory storage media of claim 9, wherein the knowledge graph is an external knowledge graph.

14. The one or more non-transitory storage media of claim 9, wherein the retrieving of the relevant entities and relations comprises performing a full-text search over documents created from the knowledge graph.

15. The one or more non-transitory storage media of claim 14, wherein the performing of the full-text search comprises querying the documents with the textual sentence as a query.

16. The one or more non-transitory storage media of claim 9, wherein the enhanced sentence representation is used to train a supervised classifier on a human-annotated dataset.

17. A computer system, comprising:

a processor; and one or more computer-readable media comprising computer-executable instructions that, when executed by the processor, cause the computer system to perform a method comprising:

generating a sentence representation of a textual sentence;

retrieving entities and relations from a knowledge graph that are relevant to the textual sentence;

generating a representation of the relevant entities and relations; and combining the sentence representation and the representation of the relevant entities and relations to produce an enhanced sentence representation.

18. The computer system of claim 17, wherein the generated sentence representation is a low-dimensional vector representation.

19. The computer system of claim 18, wherein the method further comprises:

encoding the textual sentence, by a long short-term memory network, to produce the low-dimensional vector representation.

20. The computer system of claim 18, wherein the method further comprises:

encoding the textual sentence, by a convolutional neural network, to produce the low-dimensional vector representation.

\* \* \* \* \*